United States Patent [19]

Minagawa

[11] Patent Number: 5,134,904
[45] Date of Patent: Aug. 4, 1992

[54] CLUTCH-TO-CLUTCH SHIFTING

[75] Inventor: Yusuke Minagawa, Yokohama, Japan

[73] Assignee: Nissan Motor Co., Ltd., Yokohama, Japan

[21] Appl. No.: 693,301

[22] Filed: May 1, 1991

[30] Foreign Application Priority Data

May 1, 1990 [JP] Japan .................. 2-115597

[51] Int. Cl.$^5$ ............................................. F16H 61/08
[52] U.S. Cl. ............................ 74/866; 364/424.1
[58] Field of Search ................ 74/866; 364/424.1

[56] References Cited

U.S. PATENT DOCUMENTS

| 3,719,096 | 3/1973 | Sprague et al. ............. 74/866 X |
| 3,942,393 | 3/1976 | Forster et al. ............... 74/866 |
| 4,224,042 | 9/1980 | Rabus et al. ................ 74/866 |
| 4,226,295 | 10/1980 | Rembold et al. ............ 74/866 X |
| 4,228,700 | 10/1980 | Espenschied et al. ....... 74/866 |
| 4,485,443 | 11/1984 | Knödler et al. ............. 74/866 X |
| 4,730,521 | 3/1988 | Hayasaki et al. ........... 74/867 |
| 4,852,006 | 7/1989 | Speranza .................... 364/424.1 |
| 4,897,790 | 1/1990 | Bieber ........................ 74/866 X |
| 4,898,049 | 2/1990 | Niikura ....................... 74/866 |
| 4,947,329 | 8/1990 | Benford et al. ............. 364/424.1 |
| 4,947,331 | 8/1990 | Speranza .................... 364/424.1 |

FOREIGN PATENT DOCUMENTS 0214467 3/1987 European Pat. Off. .

OTHER PUBLICATIONS

M. B. Leising et al. Adaptive Control Strategies for Clutch-To-Clutch Shifting SAE Paper No. 905048 pp. 331 to 341 no date.

Maurice B. Leising et al. The All-Adaptive Controls for the Chrysler Ultradrive Transaxle SAE paper No. 890529 pp. 45 to 53 no date.

Nissan Full-Range Electronically Controlled Automatic Transmission Service Manual, (A261C07) (no date).

Primary Examiner—Dirk Wright
Attorney, Agent, or Firm—Foley & Lardner

[57] ABSTRACT

A clutch-to-clutch shifting in an automatic transmission is disclosed. According to the present invention, a timing at which an off-going element is to be released after engagement process of an on-coming element has been initiated is determined in response to a derivative, with respect to time, of a revolution speed of a rotary element, i.e., an input shaft.

6 Claims, 5 Drawing Sheets

CLUTCH-TO-CLUTCH SHIFTING

BACKGROUND OF THE INVENTION

The present invention relates to a method of and a system for a shift control in an automatic transmission drivingly coupled with an engine with a load control member.

U.S. Pat. No. 4,730,521 issued to Hayasaki et al. on Mar. 15, 1988 and European Patent Application published under publication No. 0214467 on Oct. 19, 1988 disclose an automatic transmission including a forward one-way clutch and a low one-way clutch. In the known automatic transmission, the one-way clutch overruns to effect a smooth shockless shift. The provision of the one-way clutches has made contribution to simplification of an engagement control of an on-coming friction element. However, the provision of such one-way clutches are obstacle to making the automatic transmissions compact. In order to remove the one-way clutches, SAE papers 890529 and 905048 propose an adaptive control for clutch-to-clutch shifting.

An object of the present invention is to provide an improved method of and system for a shift control in an automatic transmission such that a moment at which an off-going element is to be released is easily and quickly determined.

SUMMARY OF THE INVENTION

According to the present invention, there is provided a method of a shift control in an automatic transmission drivingly coupled with an engine with a load control member, the automatic transmission including a predetermined rotary element, an off-going element, and an on-coming element, the method comprising the steps of:

initiating engagement process of the on-coming element;

detecting a revolution speed of the predetermined rotary element and generating a revolution speed indicative signal indicative of said revolution speed detected;

determining a derivative, with respect to time, of said revolution speed indicative signal and generating derivative indicative signal indicative if said derivative determined; and releasing the off-going element is in response to said derivative indicative signal.

According to another aspect of the present invention there is provided a system for a shift control in an automatic transmission drivingly coupled with an engine, the automatic transmission including a predetermined rotary element, an off-going element, and an on-coming element, the system comprising:

means for detecting a revolution speed of the predetermined rotary element and generating a revolution speed indicative signal indicative of said revolution speed detected; and means for initiating engagement process of the on-coming element, determining a derivative, with respect to time, of said revolution speed indicative signal and generating derivative indicative signal indicative of said derivative determined, and releasing the off-going element in response to said derivative indicative signal.

DETAILED DESCRIPTION OF THE INVENTION

Figure 1:
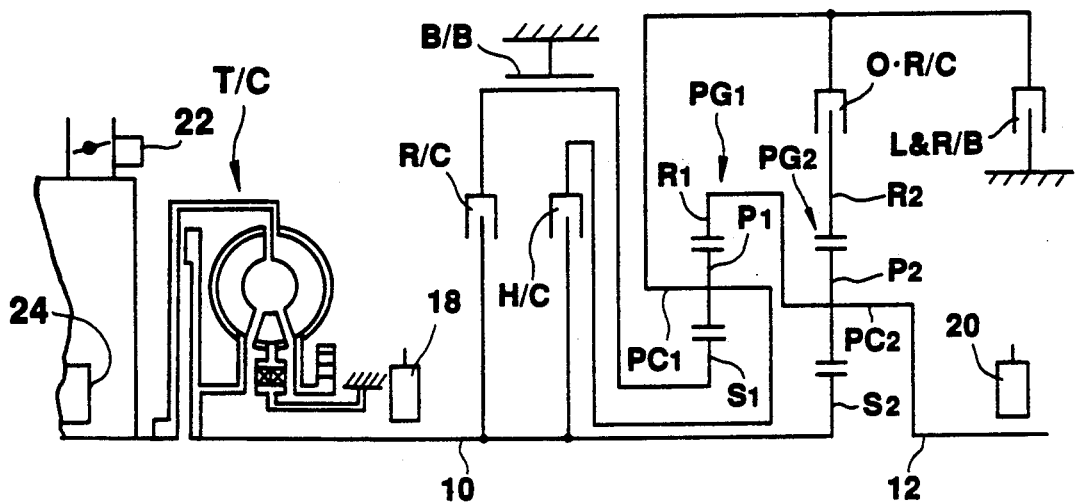
FIG. 1 is a schematic view of an automatic transmission drivingly coupled with an engine via a torque converter.

Referring to FIG. 1, an automatic transmission has an input shaft (a turbine shaft) 10 drivingly coupled via a torque converter T/C to an engine having a load control member in the form of a throttle valve which opens in degrees. The automatic transmission has an output shaft 12, a first planetary gear set $PG_1$ and a second planetary gear set $PG_2$.

The first planetary gear set $PG_1$ includes a sun gear $S_1$, a pinion carrier $PC_1$ rotatably supporting a plurality of pinions $P_1$ meshing the sun gear $S_1$, and a ring gear $R_1$ meshing the pinions $P_1$. The second planetary gear $PG_2$ includes a sun gear $S_2$ rotatable with the input shaft 10, a pinion carrier $PC_2$ rotatably supporting a plurality of pinions $P_2$ meshing the sun gear $S_2$, and a ring gear $R_2$ meshing the plurality of pinions $P_2$. The pinion carrier $PC_2$ is rotatable with both the ring gear $R_1$ and the output shaft 12. A band brake B/B is provided to hold the sun gear $S_1$ stationary. A reverse clutch R/C is operatively disposed between the input shaft 10 and the sun gear $S_1$ to selectively establish a drive connection therebetween. A high clutch H/C is operatively disposed between the input shaft 10 and the pinion carrier $PC_1$ to selectively establish a drive connection therebetween. An overrunning clutch O·R/C is operatively disposed between the pinion carrier $PC_1$ and the ring gear $R_2$ to selectively establish a drive connection therebetween. A low reverse brake L&R/B is provided to hold the pinion carrier $PC_1$ stationary.

This automatic transmission provides four forward gears or speeds and one reverse gear or speed. For the first gear, the overrunning clutch O·R/C and low reverse brake L&R/B are both engaged. A 1-2 upshift is effected by releasing the low reverse brake L&R/B and engaging the band brake B/B. A 2-3 upshift is effected by releasing the band brake B/B and engaging the high clutch H/C. A 3-4 upshift is effected by releasing the overrunning clutch O·R/C and engaging the band brake B/B. The reverse R/C and low reverse brake L&R/B are both engaged for the reverse gear drive.

Figure 2:
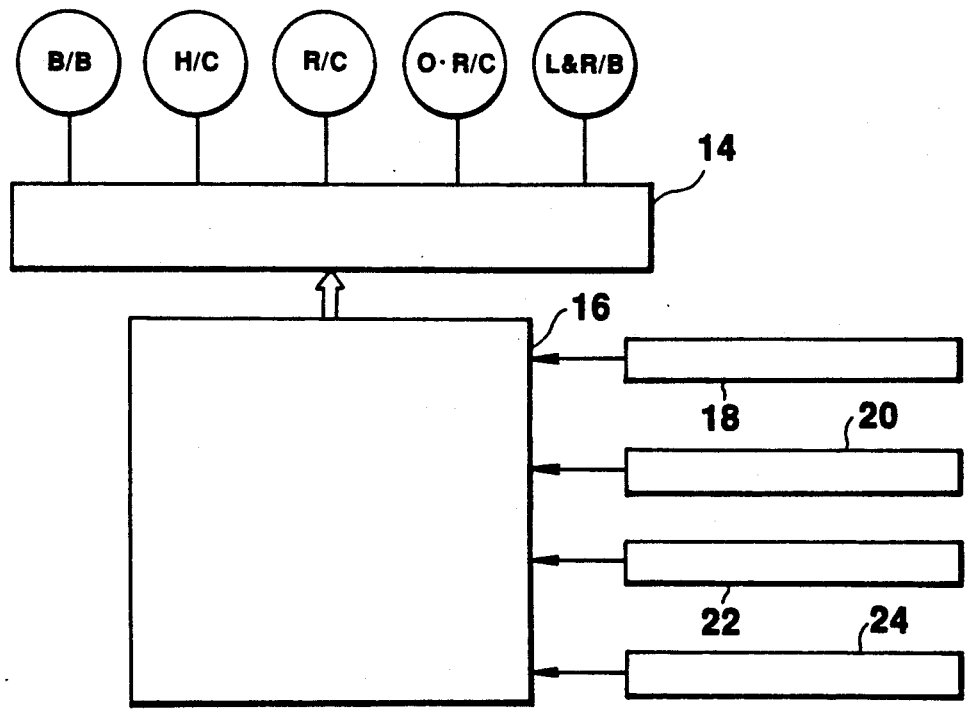
FIG. 2 is a block diagram of a control arrangement including a hydraulic control valve assembly with various friction elements, and a control unit with various sensors.

Referring to FIG. 2, the release and engagement of the above-mentioned friction elements are hydraulically controlled by a hydraulic control valve assembly 14 which is operatively connected with a control unit 16.

A turbine sensor 18 is provided to detect a revolution speed of the input shaft 10 and generate an input shaft revolution speed indicative signal indicative of the input shaft revolution speed detected. An output shaft revolution speed sensor 20 is provided to detect a revolution speed of the output shaft 12 and generate an output shaft revolution speed indicative signal indicative of the output shaft revolution speed detected. A throttle opening degree sensor 22 is provided to detect a throttle opening degree of the engine and generate a throttle opening degree indicative signal indicative of the throttle opening degree detected. An engine revolution speed sensor 24 is provided to detect a revolution speed of the engine and generate an engine revolution speed indicative signal indicative of the engine revolution speed detected. The sensor outputs of the above-mentioned sensors 18, 20, 22, and 24 are supplied to the control unit 16.

The control unit 16 is a microcomputer based control unit which is similar to that used in a known automatic transmission of the RE4R01A type which is described in a service manual "NISSAN FULL-RANGE ELECTRONICALLY CONTROLLED AUTOMATIC TRANSMISSION (A261C07)" published in March 1987. Reference should be made to this service manual in full understanding of the previously mentioned components of the automatic transmission used in this embodiment.

Figure 3:
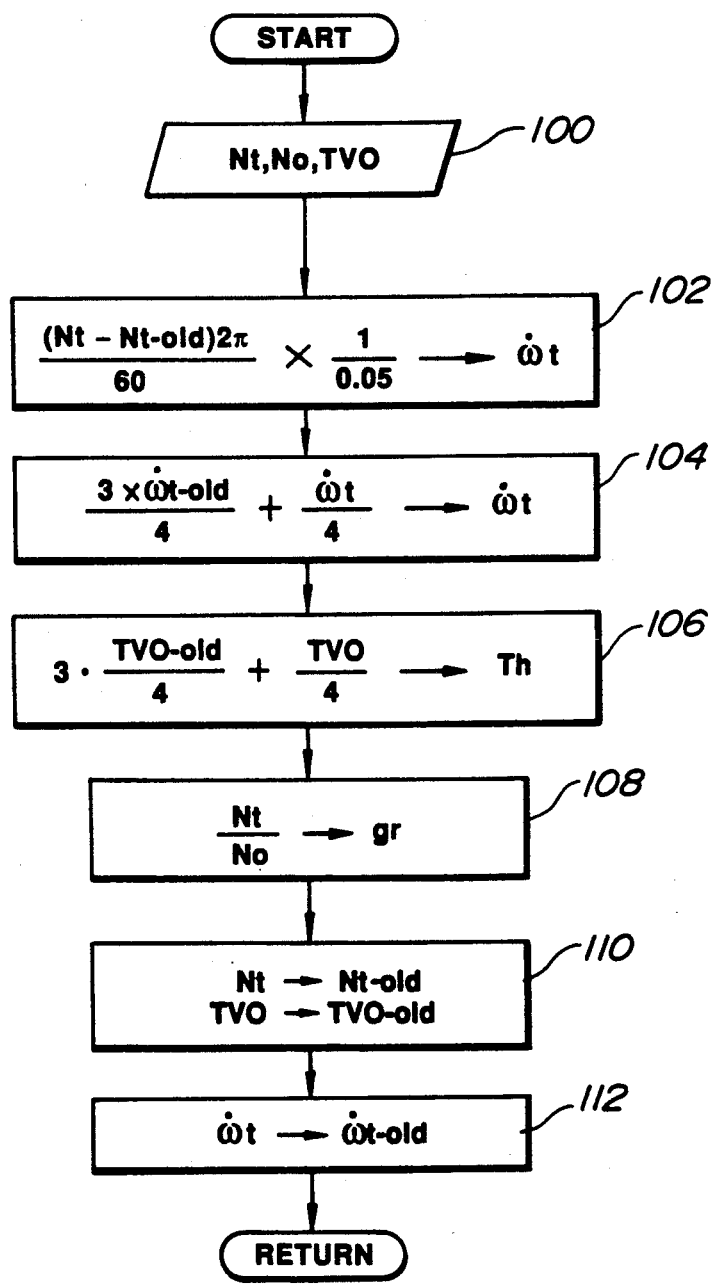
FIG. 3 is a flow chart of a shift control used in an embodiment.
Figure 4:
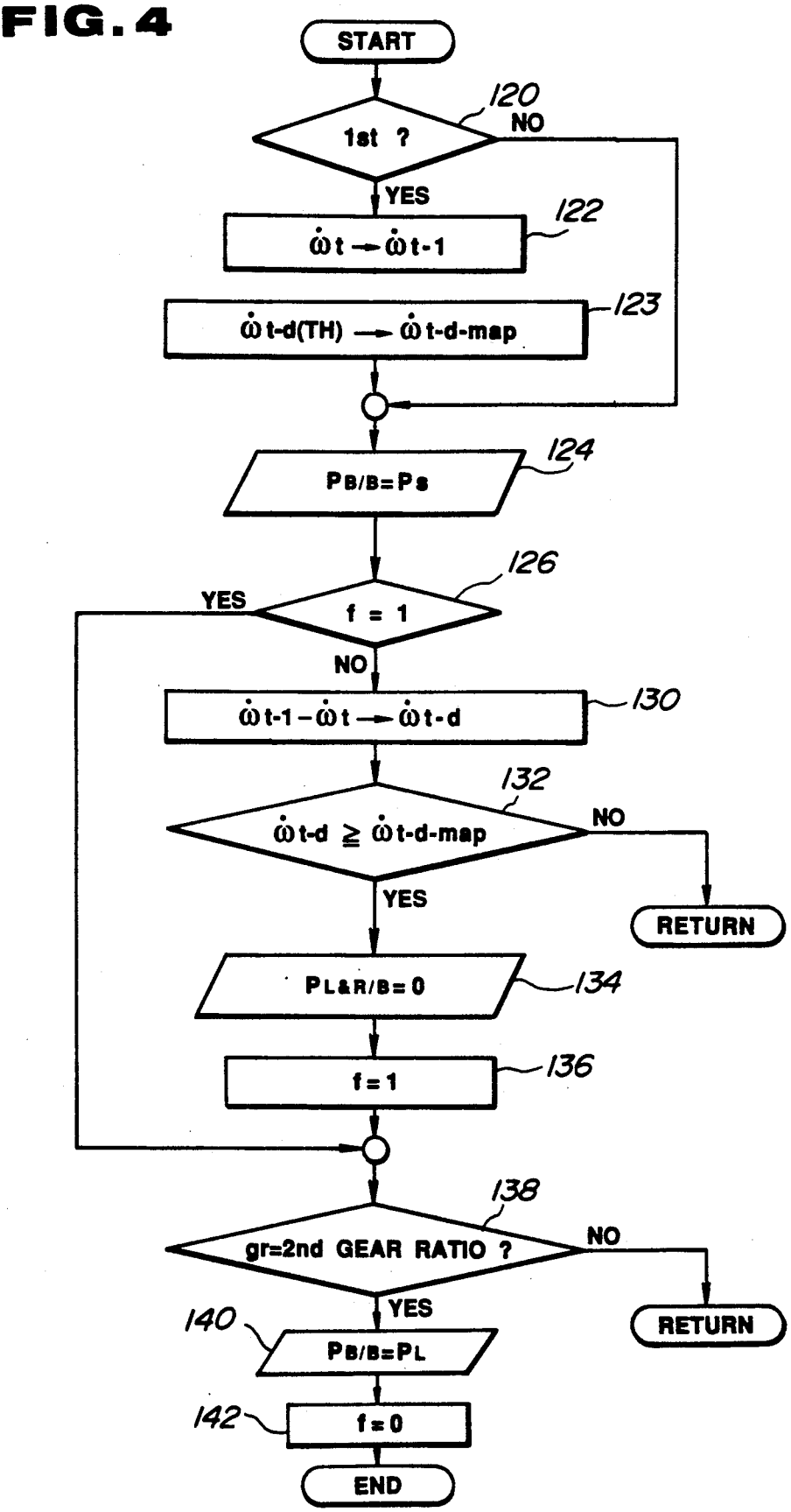
FIG. 4 is a flow chart of the shift control.

The present invention is further described taking a 1-2 upshift as an example. FIGS. 3 and 4 are flow charts of programs stored in the control unit 16.

Referring to FIGS. 3 and 4, execution of the flow chart shown in FIG. 3 is repeated upon expiration of a predetermined period of time, i.e., 5 msec. in this embodiment, while execution of the flow chart shown in FIG. 4 is initiated upon issuance of an upshift command, i.e., a 1-2 upshift command in this embodiment, and the execution is repeated thereafter upon expiration of a predetermined period of time, i.e., 5 msec. in this embodiment.

Figure 5:
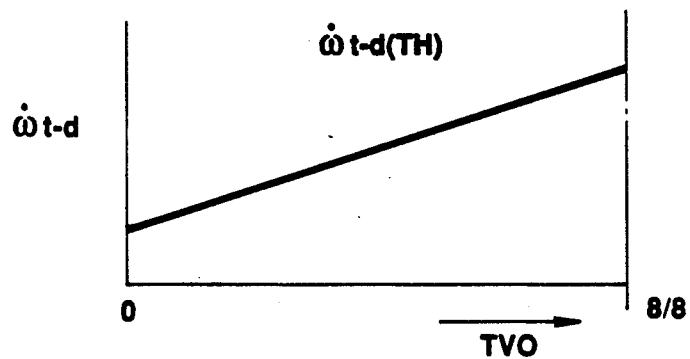
FIG. 5 is a data map used in the shift control.
Figures 6A, 6B, 6C:
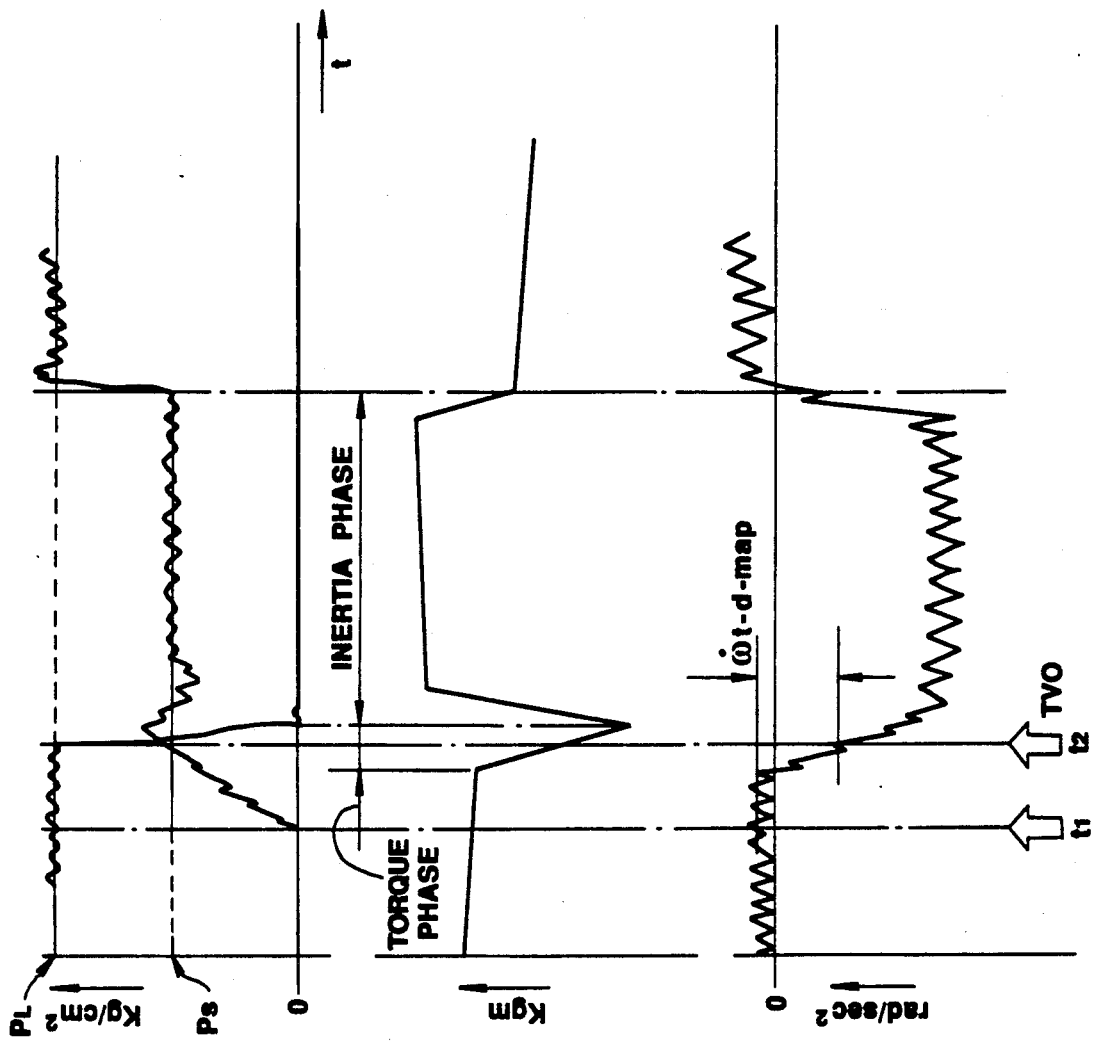
FIGS. 6(a), 6(b) and 6(c) are time charts used to explain the shift control.

The upshift is effected by releasing engagement of an off-going element and applying an on-coming element. For the 1-2 upshift, the off-going element is the low reverse brake L&R/B and the on-coming element the band brake B/B. For improved quality of the 1-2 upshift, it is required to detect or determine a timing at which the off-going element is to be released in order to make a smooth shift from torque phase to inertia phase where the on-coming element develops sufficient pressure to start the speed change. It is essential according to the present invention to determine this release timing based on the rate of change of revolution speed of a rotary element, i.e., the derivative, with respect to time, of revolution speed of the rotary element. According to the embodiment, the rotary element is the transmission input shaft (turbine shaft) 10, and it is determined that the off-going element is released when a difference between a magnitude of the derivative at issuance of a shift command and a magnitude of the derivative at present becomes equal to or greater than a reference value. Preferrably, the reference value depends on magnitude of load on the engine. FIG. 5 is a graph illustrating the reference value data versus different magnitudes of throttle opening degree. In FIG. 5, the reference value is represented by $\dot{\omega}t-d$ (omega dot t−d), and the throttle opening degree TVO. FIGS. 6(a), 6(b), and 6(c) are time charts for 1-2 upshift. FIG. 6(a) illustrates variations of actual servo activating hydraulic fluid pressures in the off-going element and the on-coming element in comparison with this pressure values instructed. FIG. 6(b) is a variation of output torque of the transmission output shaft. FIG. 6(c) is a variation of the derivative, with respect to time, of revolution speed of the transmission input shaft. In these FIGS. 6(a), 6(b), and 6(c), a shift command is issued at a moment $t_1$, and the pressure value instructed drops to the minimum, i.e., zero at a release moment $t_2$ to completely discharge hydraulic fluid from the off-going element. The release moment $t_2$ is when the difference between the magnitude of the derivative, namely $\dot{\omega}t-1$ (omega dot t-1), at the moment $t_1$ and the magnitude of the derivative, namely $\dot{\omega}t$ (omega dot t), at present become equal to or greater than the reference value, namely $\dot{\omega}t-d$-map (omega dot t-d-map), which has been obtained from the data map shown in FIG. 5.

Referring back to FIG. 3, at a step 100, reading operations of output signals of the input shaft revolution speed sensor 18, output shaft revolution speed sensor 20, and throttle opening degree sensor 22 are performed to store the results as an input shaft revolution speed Nt, an output shaft revolution speed No, and a throttle value opening degree TWO, respectively. Thereafter, if a predetermined condition has been met, the flow proceeds to a step 102 where the derivative, with respect to time, of the input shaft revolution speed Nt is determined. At the step 102, the derivative which is now represented as $\dot{\omega}t$ (omega dot 5) is determined by calculating the following terms.

$$\frac{(Nt - Nt - \text{old}) \cdot 2\pi}{60} \times \frac{1}{0.05}$$

The result is stored as $\dot{\omega}t$ (omaga dot t). The content of this data stored as $\dot{\omega}t$ (omega dot t) is refined by a filtering process conducted at a step 104 to eliminate cycle-to-cycle variability of the result of calculation of the terms conducted at the step 102. At the step 104, calculation of the following terms is made.

$$\frac{3 \times \dot{\omega}t - \text{old}}{4} + \frac{\dot{\omega}t}{4}$$

Subsequently, the flow proceeds to a step 106 where filtering process is conducted to eliminate cycle-to-cycle variability of throttle opening degree TVO stored at the step 100. At the step 106, calculation of the following terms is made.

$$3 \cdot \frac{TVO - \text{old}}{4} + \frac{TVO}{4}$$

The result is stored as Th. Then, the flow proceeds to a step 108 where a speed or gear ratio is determined by calculating a ratio Nt/No and the result is stored as a gear ratio gr. Finally, the flow proceeds to steps 110 and 112 where the data Nt and TVO obtained in this cycle are stored as the old data Nt-old and TVO-old, respectively, and the data $\dot{\omega}t$ (omega dot t) refined in this cycle is stored as $\dot{\omega}t$−old.

The before-mentioned predetermined condition is described. In order to remove influence of external disturbances on processes on the steps 102, 104, 106, 108, 110, and 112, it is determined whether or not a rate-of-change of engine revolution speed (Ne) or input shaft revolution speed Nt or output shaft revolution speed No or throttle opening degree TVO is less than a predetermined value. If this inquiey results in affirmative, the flow proceeds to the step 102 and onwards. However, if it results in negative, this cycle ends and thus the step 102 and onwards are not executed.

Referring to FIG. 4, the execution of this flow is initiated upon issuance of a shift command. At a step 120, it is determined whether this cycle is the first occurrence or not. If this inquiry results in affirmative, the flow proceeds to a step 122 where the content of $\dot{\omega}t$ (omega dot t) is stored as a derivative $\dot{\omega}t$-1 (omaga dot t-1) at the moment $t_1$, see FIG. 6(c). Then, the flow proceeds to a step 123 where a table look-up operation of FIG. 5 based on TVO is performed to give a result as a reference value ω̇t−d-map (omega dot t-d-map). the initialization at the steps 122 and 123 is executed only once after issuance of the shift command since in the subsequent cycles these steps 122 and 123 are skipped.

At a step 124, a pressure value for the on-coming element (second brake B/B) $P_{B/B}$ is set equal to a shelf pressure $P_S$, see FIG. 6(a). The flow then proceeds to a step 126 where it is determined whether a flag f is set equal to 1 or not. Since initially the flag f is zero and not equal to 1, the flow proceeds from this step 126 to steps 130 and 132. At the step 130, a difference between ω̇t−1 (omega dot t−1) set at the step 122 and ω̇t (omega dot) is calculated and the magnitude of the result is set as ω̇t-d (omega dot t−d). At the step 132, it is determined whether or not ω̇t−d (omega dot t−d) is equal to or greater than ω̇t−d-map (omega dot t−d-map). Referring to FIG. 6(c), between the moments $t_1$ and $t_2$, the inquiry at the step 132 results in negative in each of cycles and the magnitude of difference ω̇t−d (omega dot t−d) is kept checked. At the moment $t_2$, the inquiry at the step 132 becomes affirmative, and the flow proceeds from this step 132 to a step 134 where a pressure value for the off-going element (low and reverse brake L&R/B) $P_{L\&R/B}$ is set equal to zero to discharge hydraulic fluid from the off-going element. Then, the flow proceeds to a step 136 where the flag f is set equal to 1.

On or immediatelky after the moment $t_2$, there occurs a shift from the torque phase to the inertia phase where the on-coming element (band brake B/B) develops sufficient pressure to start the gear ratio change.

After setting the flag f, the steps 130, 132, 134 and 136 are skipped and thus the flow proceeds from the step 126 to a step 133 where it is determined whether or not the gear ratio gr is equal to a gear ratio for a higher gear (second gear). After the inquiry at this step 133 results in affirmative, the flow proceeds to steps 140 and 142. At the step 140, the pressure value $P_{B/B}$ is set equal to the maximum $P_L$ (line pressure), and at the step 142, the flag f is reset to zero.

In the preceding description, the 1–2 upshift has been exemplified. The present invention, however, is applicable to other upshifts.

According to the present invention, the release moment for the off-going element is determined based on the derivative, with respect to time, of the revolution speed of the rotary element of the automatic transmission. In other words, the initiation of the inertia phase is determined quickly and easily.

The initiation of the inertia phase may be determined based on a revolution speed of the rotary element. However, this process requires a great number of data of reference values versus different engine revolution speed values at issuances of the shift command, adding complexity to the control.

What is claimed is:

1. A method of a shift control in an automatic transmission drivingly coupled with an engine with a load control member, the automatic transmission including a predetermined rotary element, an off-going element, and an on-coming element, the method comprising the steps of:
   initiating engagement process of the on-coming element;
   detecting a revolution speed of the predetermined rotary element and generating a revolution speed indicative signal indicative of said revolution speed detected;
   determining a derivative, with respect to time, of said revolution speed indicative signal and generating derivative indicative signal indicative of said derivative determined; and
   releasing the off-going element in response to said derivative indicative signal.

2. A method as claimed in claim 1, further comprising the steps of:
   detecting a state of the engine load control member and generating an engine load indicative signal indicative of said engine load detected;
   determining a reference as a function of said engine load indicative signal that is generated upon issuance of a shift command and generating a reference indicative signal indicative of said reference determined; and
   determining whether or not a difference between said derivative indicative signal determined upon issuance of said shift command and said derivative indicative signal determined at present moment satisfies a predetermined relationship with said reference indicative signal.

3. A method as claimed in claim 2, wherein releasing of the off-going element occurs at a moment when said difference satisfies said predetermined relationship.

4. A method as claimed in claim 1, wherein the predetermined rotary element is an input shaft of the automatic transmission.

5. A system for a shift control in an automatic transmission drivingly coupled with an engine, the automatic transmission including a predetermined rotary element, an off-going element, and an on-coming element, the system comprising:
   means for detecting a revolution speed of the predetermined rotary element and generating a revolution speed indicative signal indicative of said revolution speed detected; and
   means for initiating engagement process of the on-coming element, determining a derivative, with respect to time, of said revolution speed indicative signal and generating derivative indicative signal indicative of said derivative determined, and releasing the off-going element in response to said derivative indicative signal.

6. A system as claimed in claim 5, wherein the predetermined rotary element is an input shaft of the automatic transmission.

* * * * *